A. & M. LEE.
TRACTOR.
APPLICATION FILED APR. 5, 1915.

1,199,194.

Patented Sept. 26, 1916.
2 SHEETS—SHEET 1.

WITNESSES:
A. E. Carlsen.
L. C. Carlsen.

INVENTORS:
Andrew Lee,
Millard Lee,
BY their ATTORNEY:
A. M. Carlsen.

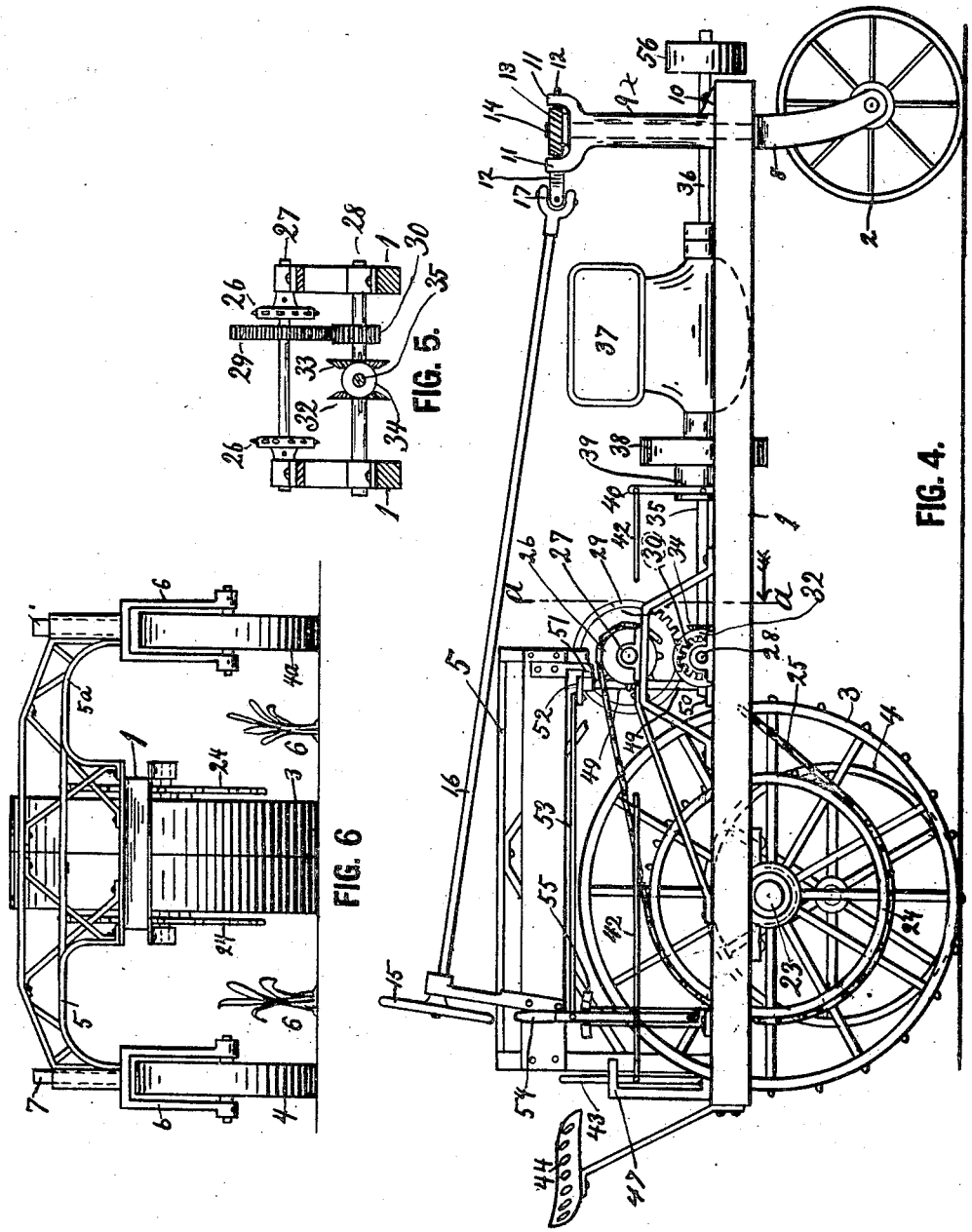

UNITED STATES PATENT OFFICE.

ANDREW LEE AND MILLARD LEE, OF BECKER, MINNESOTA.

TRACTOR.

1,199,194.

Specification of Letters Patent.   Patented Sept. 26, 1916.

Application filed April 5, 1915.   Serial No. 19,397.

*To all whom it may concern:*

Be it known that we, ANDREW LEE and MILLARD LEE, citizens of the United States, residing at Becker, in the county of Sherburne and State of Minnesota, have invented a new and useful Tractor, of which the following is a specification.

Our invention relates to tractors, and the main object is to provide a tractor which when drawing a cultivator will not damage the rows of corn or other partly grown plants but is provided with clearings to straddle the same. This and other objects we attain by the novel construction and arrangement of parts illustrated in the accompanying drawing, in which,—

Figure 2:
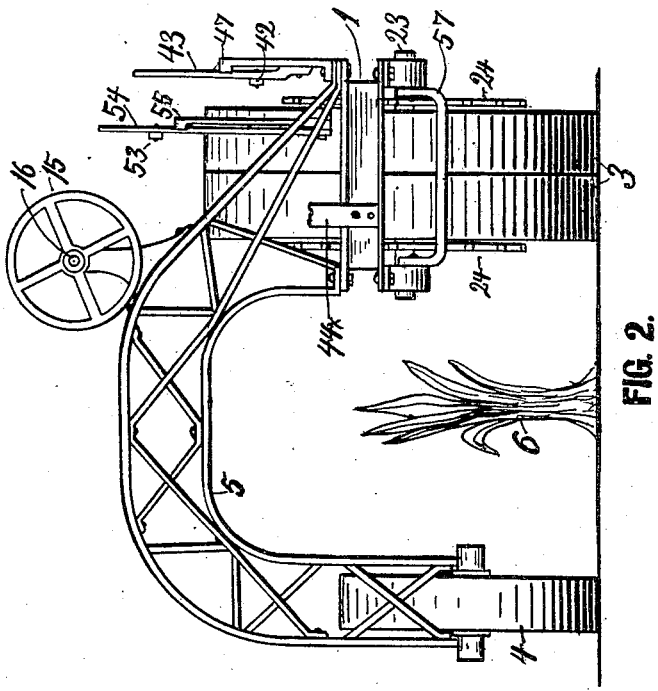
Figure 1:
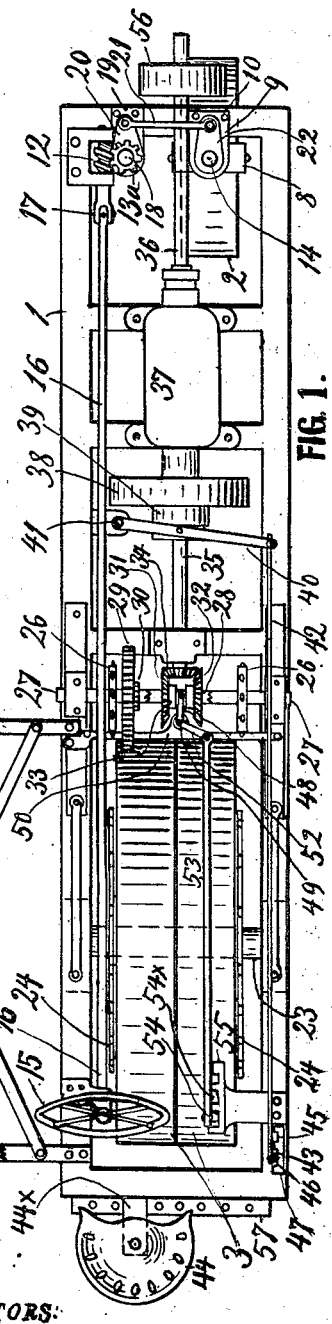
Figure 3:
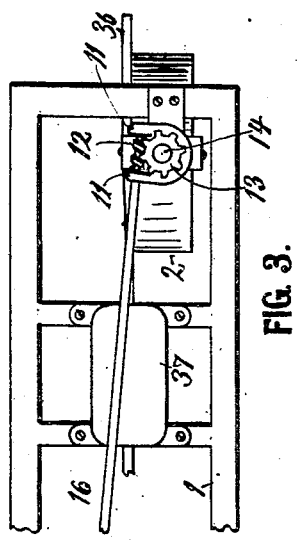

Figure 1 is a top view of our improved tractor. Fig. 2 is a rear end elevation of the tractor with some parts omitted. Fig. 3 is a portion of the front end of the machine in Fig. 1 with the steering mechanism slightly modified. Fig. 4 is a right hand side elevation of the tractor with the steering mechanism arranged as in Fig. 3 and a few elements partly broken away at the middle and rear portion of the machine. Fig. 5 is a section on the line *a—a* Fig. 4. Fig. 6 is a rear end elevation on a reduced scale of the machine so modified that it has clearings for one row of plants at each side of the traction wheels; in said view many parts are omitted because they are clearly shown in other views.

Referring to the drawings by reference numerals, 1 designates the main frame of the tractor. It is supported on a front steering wheel 2 a traction wheel 3, 3 which is preferably made in two wheels, and a laterally arranged supporting wheel 4, the latter is arranged in the outer leg of a skeletoned arch 5, which arch serves to straddle the plants (see 6 in Fig. 2). In the modification shown in Fig. 6 there are two arches, 5 and 5ª one at each side of the main frame so as to straddle two rows of plants while the traction wheels, which are arranged closely together, pass between the rows and the wheels, 4, 4ª, pass one outside of each row.

In Fig. 6 the wheels 4, 4ª are shown as mounted in forks 6 having square stems 7 fitted to slide vertically in the arches so as to adjust themselves slightly up and down when they or the traction wheels 3 pass over uneven ground. In other respects Fig. 6 is the same as the other views, which will now be further described.

The fork 8 of the steering wheel is journaled in a bracket 9, secured at 10 to the frame and provided at its top with two lugs 11, (see Figs. 3 and 4) in which is journaled a worm-screw 12, which rotates a worm gear 13 fixed on the stem 14 of the fork. The worm screw is turned by a hand wheel 15 and a shaft 16 which may preferably have a universal joint 17 as shown in Fig. 4.

In Fig. 1 is shown how the shaft 16 may extend directly forward and have its screw 12 engaged with a worm gear 13ª, which rotates on a stud 18 of a bracket 19 and has a rocker arm 20 connected by a rod 21 with a similar rocker arm 22 fixed on the fork stem 14, whose bracket 9ˣ is then without the lugs 11 shown in Fig. 4.

The traction wheels 3 rotate either on or with their axle 23 and to each of them is secured a sprocket wheel 24 which is rotated by a link belt 25 from a smaller sprocket 26 fixed on a shaft 27, the middle portion of which is broken away in Fig. 1 to expose another shaft 28 below it. On the shaft 27 is fixed a gear wheel 29, which is driven by a gear pinion 30 fixed on the shaft 28, and the latter shaft is rotated alternately in opposite directions as may be required in going forward or backward with the whole machine. For the purpose of such rotation two bevel gears, 31, 32, are secured together by an annularly grooved sleeve 33 and slidably keyed on the shaft 28. One of the wheels, 31, 32, is in its turn rotated by a smaller bevel gear 34, which is fixed on a shaft 35, and the latter shaft is arranged in axial alinement with the shaft 36 of an engine 37, which is mounted on the main frame and has a combined fly-wheel and clutch member 38, adapted to clutch with a member 39 on the shaft 35. The latter member being engaged by a shifter lever 40 fulcrumed at 41 and having a rod 42 attached to a hand lever 43, which by an operator (not shown) on the seat 44, which is mounted on a post 44ˣ, may be thrown into either one of two notches, 45, 46, in a bracket 47 fixed on the rear end of the frame.

The sleeve 33 is slid endwise by a radial arm 48 of a vertical rock shaft 49, mounted in bearings 50, 51, (see Figs. 1 and 4) and provided with an upper rocker arm 52, which by a rod 53 is connected with a hand lever 54, arranged to interlock alternately in two notches in a bracket 55. Upon the front end of the engine shaft 36 is fixed a pulley 56 by which power may be transmitted to any kind of working machinery when the tractor stands still and the engine is running, the lever 54 being placed in the notch 54ˣ, so as to hold both bevel gears, 31, 32, disengaged from the gear 34. The rear end of the tractor is provided with a draw bar 57, having several holes in which to attach cultivators for corn and other plants planted in rows.

From the above description it will be understood that the engine may be started and the tractor may be steered, reversed and stopped by the same one person, who after starting the engine occupies the seat 44. Also that the cultivator or cultivators drawn by the tractor can be arranged to work nicely at both sides of one or two rows of plants at a time, and that the arched form of the frame will make it pass over the plants without injuring them; and that the skeleton form of said arches make them strong and durable without being unnecessarily heavy.

What we claim is:

1. In a tractor the combination with an elongated narrow frame and an engine mounted thereon, of a traction wheel arranged within the rear end of the narrow frame and operatively connected with the engine, a steering wheel supporting the front end of the frame and a draft bar at the rear end of the frame; said frame having its rear portion provided with a lateral arch and a ground wheel mounted in the outer leg of said arch; said arch being a skeletoned framework with X-shaped braces to give it rigidity.

2. In a tractor the combination with an elongated narrow frame and an engine mounted on same, of a steering wheel supporting the front end of the frame and a traction wheel supporting the rear end of the frame and operatively connected with the engine, said frame having its rear portion provided with two oppositely arranged lateral arches and a supporting wheel in the outer leg of each of said arches, and a draft bar at the rear end of the frame for drawing cultivators for corn or other plants arranged in rows, said arches being of skeleton form and having in their upper portions diagonal crossed braces to stiffen them against forward and rearward pressure and braces to resist upward and downward pressure.

3. In a tractor the combination with an elongated narrow frame and an engine mounted thereon, of a traction wheel arranged within the rear end of the narrow frame and operatively connected with the engine, a steering wheel supporting the front end of the frame and a draft bar at the rear end of the frame; said frame having its rear portion provided with a lateral arch and a ground wheel mounted in the outer leg of said arch, said traction wheel being composed of two wheels placed close together.

4. In a tractor the combination with an elongated narrow frame and an engine mounted thereon, of traction wheels arranged within the rear end of the frame and operatively connected with the engine, a steering wheel supporting the front end of the frame and a draft bar at the rear end of the frame; said frame having at each side a lateral arch with a ground wheel in the outer leg thereof, said ground wheels having a vertically yielding movement.

In testimony whereof we affix our signatures, in presence of two witnesses.

ANDREW LEE.
MILLARD LEE.

Witnesses:
W. E. CRUZEN,
T. M. THOMPSON.